United States Patent
Xie et al.

(10) Patent No.: US 8,520,416 B2
(45) Date of Patent: Aug. 27, 2013

(54) CURRENT REFERENCE GENERATING CIRCUIT AND A CONSTANT CURRENT SWITCH MODE POWER SUPPLY CONTROL CIRCUIT AND METHOD THEREOF

(71) Applicant: Hangzhou Silan Microelectronics Co., Ltd., Hangzhou (CN)

(72) Inventors: Xiaogao Xie, Hangzhou (CN); Jianxing Wu, Hangzhou (CN)

(73) Assignee: Hangzhou Silan Microelectronics Co., Ltd., Hangzhou, Zhejiang Province (CN)

( * ) Notice: Subject to any disclaimer, the term of this patent is extended or adjusted under 35 U.S.C. 154(b) by 0 days.

(21) Appl. No.: 13/662,231

(22) Filed: Oct. 26, 2012

(65) Prior Publication Data
US 2013/0051090 A1 Feb. 28, 2013

Related U.S. Application Data

(63) Continuation of application No. PCT/CN2012/072082, filed on Mar. 8, 2012.

(30) Foreign Application Priority Data

Mar. 10, 2011 (CN) .......................... 2011 1 0059148

(51) Int. Cl.
*H02M 3/335* (2006.01)
(52) U.S. Cl.
USPC ...................................................... 363/21.17
(58) Field of Classification Search
USPC .......................................... 363/21.12–21.18
See application file for complete search history.

(56) References Cited

U.S. PATENT DOCUMENTS

| | | | | |
|---|---|---|---|---|
| 4,402,039 A | * | 8/1983 | Jirka | 363/21.12 |
| 6,944,034 B1 | * | 9/2005 | Shteynberg et al. | 363/21.13 |
| 7,099,163 B1 | | 8/2006 | Ying | |
| 7,787,263 B2 | * | 8/2010 | Oettinger et al. | 363/21.13 |
| 7,894,216 B2 | * | 2/2011 | Melanson | 363/21.13 |
| 8,194,420 B2 | * | 6/2012 | Tumminaro et al. | 363/21.12 |
| 8,279,630 B2 | * | 10/2012 | Choi | 363/21.12 |
| 2011/0216559 A1 | | 9/2011 | Ng et al. | |

FOREIGN PATENT DOCUMENTS

| | | |
|---|---|---|
| CN | 201477463 U | 5/2010 |
| CN | 101944858 A | 1/2011 |
| CN | 101984732 A | 3/2011 |
| CN | 102368662 A | 3/2012 |

* cited by examiner

*Primary Examiner* — Jue Zhang
(74) *Attorney, Agent, or Firm* — Birch, Stewart, Kolasch & Birch, LLP

(57) ABSTRACT

A current reference generating circuit including a first multiplier module, configured to receive a rectified voltage waveform signal of a switch mode power supply and an output signal generated by an average current loop, and to generate a sinusoidal half-wave signal having the same frequency and phase as the rectified voltage waveform signal, the sinusoidal half-wave signal varies with the output signal generated by the average current loop. A second multiplier module, configured to receive the sinusoidal half-wave signal and a control signal to generate a pulse signal. An average current loop for comparing the average of the pulse signal to a predetermined average current loop reference signal. The circuit can generate a self-adapted reference signal that follows the primary-side current signal of main circuit of the switch mode power supply, which is then supplied to the constant current switch mode power supply control circuit with high power factor.

20 Claims, 14 Drawing Sheets

CURRENT REFERENCE GENERATING CIRCUIT AND A CONSTANT CURRENT SWITCH MODE POWER SUPPLY CONTROL CIRCUIT AND METHOD THEREOF

CROSS REFERENCE TO RELATED APPLICATIONS

This application is a Continuation of PCT/CN2012/072082 filed on Mar. 8, 2012, which claims priority under U.S.C. 119(a) to Patent Application No. 201110059148.9 filed in The People's Republic of China on Mar. 10, 2011, all of which are hereby expressly incorporated by reference into the present application.

FIELD OF THE INVENTION

The present invention relates to switch mode power supply, and more specifically to a circuit for generating a primary-side current reference for a self-adapted primary-side controlled constant current switch mode power switch with high power factor, a control circuit and method thereof.

BACKGROUND

Currently, many isolating type power supplies such as cell phone charger and high-power LED driver are often required to have a capability of outputting a constant current to meet the requirement of some applications. In addition, to relieve the pressure of power pollution and satisfy the Harmonic standards such as IEEE555-2 and IEC1000-3-2 set by International Electrotechnical Commission, the above isolating type power supplies are also required to be imbued with power factor correction (PFC) functionality FIG. 1 illustrates a commonly adopted solution for single-stage power factor correction. By detecting the output current at the secondary side of the transformer, the output current is fed back via an optical coupler to a primary-side PFC control circuit after the output current has gone through a constant-current control at the secondary side. According to the prior art solution as shown in FIG. 1, circuit complexity is increased due to the existence of a circuit for sampling the current at the secondary side and the optical coupler. Further, since the optical coupler has aging problem, the stability and the lifespan of the circuit are both affected to some extent.

A control solution with both primary-side constant current control function and power factor correction function is directed to solving the above problems. That is, there is no need to sample the secondary-side current and no need for the optical coupler. Information relating to the output current is obtained directly at the primary side of the isolating type transformer. The information is controlled to realize constant current output and high power factor, as illustrated in FIG. 2. Currently, some controller chips for realizing constant current output and PFC function are commercially available. The most important two indicators evaluating the above control solution are the high power factor of the input current and the accuracy of the constant output current. Usually, since primary-side control is adopted, the constant output current is less accurate than the secondary-side controlled constant current.

Currently, a prior art solution for outputting constant current is simulating the secondary-side current at the primary side. That is, the secondary-side output current is simulated or the secondary-side average output current is calculated and then constant current is controlled at the primary side. As shown in FIG. 3, by sampling and holding the primary-side current "ipri", the primary-side current peak and the corresponding secondary-side current peak are obtained, where "ipri" denotes the primary-side current signal, "Vcontrol" denotes the sampled signal, "isample" denotes an output signal of a sample and hold module, and "iemu" denotes an output signal of a secondary-side current simulation module. However, in the actual circuit, since there exists a time delay during the switch between sample and hold performed by the sample and hold module, error may occur in the sampled primary-side current peak which in turn results in the difference between the simulated secondary-side current "iemu" and the actual value, as shown in FIG. 4. Moreover, the difference may vary with the input voltage and the magnetizing inductance of the transformer. However, such difference may not be compensated easily. Thus, the output constant current may vary with the input voltage and the magnetizing inductance of the transformer, resulting in a low accuracy of the output constant current.

Another prior art method for outputting constant current is a constant power method, as illustrated in FIG. 5. A half-wave rectified signal Vin is obtained after an input AC signal is rectified. An effective value of the input AC signal (i.e., an input voltage feed-forward signal Vff) is obtained after the half-wave rectified signal Vin passes through a voltage feed-forward module. Also, a waveform signal Mc is obtained after the input voltage feed-forward signal Vff passes through the waveform correction module K1. The waveform signal is expressed as Iac=kxVin, where K is a coefficient. In the circuit for outputting constant current, Vea is a controllable constant. The multiplexer multiplies the waveform signal Iac, the input voltage feed-forward signal Vff and the controllable constant Vea together to get a current reference signal:

$$I_{ref} = \frac{I_{ac} \times V_{ea}}{V_{ff}^2} = \frac{k \times V_{in} \times V_{ea}}{V_{ff}^2}$$

As such, the conductance current can be controlled to be in line with the current reference signal in order to realize PFC function. As can be seen, the multiplier makes the square of the input voltage feed-forward signal as the denominator. When Vea is constant, the input power is irrelevant with the input voltage, that is, constant power can be controlled. The above-described method for obtaining a current reference by utilizing a multiplier to offset the influence of the input voltage can be essentially referred to as voltage feed-forward control. However, in the presence of a phase-controlled dimmer, the input AC signal may be incomplete when the dimming phase is different. The rectified input AC signal may no longer be a complete half wave. Therefore, the input voltage feed-forward signal Vff contains a phase-cut signal. The voltage feed-forward control may result in a sharp increase in the Iref as the cutting phase increases. The input power also increases dramatically accordingly. Therefore, the foregoing method is not applicable to the phase-controlled dimming.

SUMMARY

In order to overcome the deficiencies in the foregoing prior art, a current reference generating circuit is provided. The current reference generating circuit is able to generate a self-adapted reference signal which is followed by the primary-side current signal of main circuit of the switch mode power supply, which is then supplied to the constant current switch mode power supply control circuit. The reference signal may follow the change in the input and output conditions of the circuit so as to self-adjust itself to meet the needs for generating a constant current at the secondary side.

Meanwhile, the present invention provides a primary-side controlled constant current switch mode power supply control circuit with high power factor.

The current reference generating circuit comprises the followings:

a first multiplier module, configured to receive a rectified voltage waveform signal Iac generated by a rectifier bridge in a main circuit of a switch mode power supply and an amplified error signal Vcomp generated by an average current loop, and to generate a sinusoidal half-wave signal Iref, wherein the sinusoidal half-wave signal Iref has a same frequency and phase with the rectified voltage waveform signal Iac, the amplitude of the sinusoidal half-wave signal Iref varies with the amplified error signal Vcomp and the sinusoidal half-wave signal (Iref) serves as a reference signal that is followed by a primary-side current signal of main circuit of the switch mode power supply;

a second multiplier module, configured to receive the sinusoidal half-wave signal Iref and a control signal Vcontrol and generate a pulse signal iemu, wherein the control signal Vcontrol is a pulse signal indicative of a conduct time of an output diode in the main circuit of the switch mode power supply, an amplitude envelope of the pulse signal iemu is a sinusoidal half-wave signal having the same frequency and phase with the sinusoidal half-wave signal Iref and having an amplitude in proportion with that of the sinusoidal half-wave signal Iref, and a pulse width of the pulse signal iemu equals the pulse width of the control signal Vcontrol;

an average current loop, configured to receive the pulse signal iemu and an average current loop reference signal Vref, wherein the average of the pulse signal iemu is compared to the predetermined average current loop reference signal Vref and the difference between the average of the pulse signal iemu and the predetermined average current loop reference signal Vref is amplified by a compensation network in the average current loop and the amplified difference is output as an amplified error signal Vcomp.

Further, the average current loop has a certain filtering function, which filters the pulse signal "iemu" to obtain the average of the switching period of the pulse signal "iemu".

In addition, if the average current loop does not have the filtering function or directly filters the "iemu" and feed the filtered "iemu" to the average current loop, the current reference generating circuit may further include a filter. The filter may filter the pulse signal "iemu" to remove the high frequency harmonics so as to generate the average of the switching period of the pulse signal "iemu" which is then fed to the average current loop.

Further, the waveform of the pulse signal "iemu" reflects a double of the output diode current. Therefore, constant output current can be realized by utilizing the average current loop to control the average of the pulse control signal "iemu" to be constant.

The main circuit of the switch mode power supply operates at a discontinuous current mode or at a critical current discontinuous mode.

The second multiplier module is a multiplier or an equivalent thereof.

The control signal Vcontrol comes from an auxiliary winding of the transformer of the switch mode power supply or a gate control signal of the switch mode power supply.

The amplitude of the control signal Vcontrol is constant.

The positive pulse width of the control signal Vcontrol equals conduct time of the output diode in the main circuit of the switch mode power supply.

The average current loop includes an error amplifier and a compensation network.

The average current loop reference signal Vref is a DC reference signal.

The average current loop reference signal Vref is a pulse signal indicative of the phase controlled dimming phase during phase controlled dimming.

A constant current switch mode power supply control circuit with high power factor comprises a current reference generating circuit, a module for detecting conduct time of an output diode, a comparator, a module for controlling conduction of a switch transistor and a RS Flip-flop.

The current reference generating circuit is described above.

The module for detecting conduct time of an output diode is configured to detect the conduct time of the output diode in the main circuit of the switch mode power supply, and output a control signal Vcontrol to the current reference generating circuit.

Two input terminals of the comparator receive a sinusoidal half-wave signal Iref generated by the current reference generating circuit and a sampled primary-side current signal, respectively, and the comparator is configured to compare the sinusoidal half-wave signal with the sampled primary-side current signal. When the sampled primary-side current signal rises to reach the sinusoidal half-wave signal Iref, the output signal of the comparator flips from a low voltage level to a high voltage level, and then, when the sampled primary-side current signal decreases to be lower than the sinusoidal half-wave signal Iref, the output signal of the comparator flips from a high voltage level to a low voltage level.

Two input terminals of the RS Flip-flop are coupled to an output terminal of the comparator and the module for controlling conduction of a switch transistor, and the RS Flip-flop is configured to generate a driving signal to a switch transistor in the main circuit. The output terminal of the comparator is coupled to a reset terminal R of the RS Flip-flop. The output of the module for controlling conduction of a switch transistor is coupled to a set terminal S of the RS Flip-flop. When the reset terminal R of the RS Flip-flop detects a rising edge from a low voltage level to a high voltage level, the output signal of the RS Flip-flop is reset from the high voltage level to the low voltage level, so as to control the conduction of the switch transistor in the main circuit of the switch mode power supply. When the set terminal S of the RS Flip-flop detects a rising edge from a low voltage level to a high voltage level, the output signal of the RS Flip-flop is set from a low voltage level to a high voltage level. The above operations repeats again and again and the RS Flip-flop outputs a pulse sequence signal.

The module for controlling conduction of a switch transistor is a timer trigger, and the timer trigger is configured to generate a clock signal with constant frequency provided to the set terminal S of the RS Flip-flop for controlling the conduction of the switch transistor in the main circuit of the switch mode power supply.

The module for controlling conduction of a switch transistor comprises a module for detecting conduct time of an output diode, an inverter, a delay circuit. The module for controlling conduction of a switch transistor is configured to generate a pulse signal by detecting the conduct time of the diode at the secondary side and the pulse signal is inverted and delayed for being provided to the set terminal S of the RS Flip-flop in order to control the conduction of the switch transistor in the main circuit of the switch mode power supply.

A method for controlling a constant current switch mode power supply comprises the steps of:
(1) making a main circuit of the switch mode power supply operate at a discontinuous current mode or at a critical current discontinuous mode;
(2) detecting a rectified voltage waveform signal (Iac) generated by a rectifier bridge in the main circuit of the switch mode power supply;
(3) obtaining a pulse signal (iemu) with a pulse width indicative of the conduct time of the output diode in the main circuit of the switch mode power supply and an amplitude indicative of the amplitude of the primary-side current signal;
(4) generating a current reference signal (Iref) with a waveform consistent with the output voltage of the rectifier bridge in the main circuit of the switch mode power supply and an amplitude under the control of an amplified error signal generated by an average current loop based on the rectified voltage waveform signal (Iac) obtained through step (2) and the pulse signal (iemu) obtained through step (3); feeding the current reference signal (Iref) back to step (3); controlling the generation of the pulse signal (iemu), wherein the constant output current is in proportion to an average current loop reference signal;
(5) generating a turn-off trigger signal for a drive pulse for a primary-side switch transistor based on the current reference signal (Iref) obtained through step (4) and the sampled primary-side current signal;
(6) generating a conduction trigger signal for the drive pulse for the switch transistor;
(7) repeating steps (1)-(6).

Advantageous effects of the present invention are as follows.

The output signal "iemu" generated by the second multiplier in the current reference generating circuit according to the present invention has a different waveform with the current simulated by the sample and hold module and the secondary-side current simulation module shown in FIG. 3. Although the positive pulse width of the two signals both refers to the conduct time of the output diode, the high voltage level in each pulse waveform of the "iemu" reflects an envelope of the sinusoidal half-wave signal. However, the high voltage level in the pulse current waveform simulated in FIG. 3 reflects a straight line generated by the sample and hold module. The current reference generating circuit is able to generate a self-adapted reference signal which is followed by the primary-side current signal of main circuit of the switch mode power supply, which is then supplied to the constant current switch mode power supply control circuit. The reference signal may follow the change in the input and output conditions of the circuit so as to self-adjust itself to meet the needs for generating a constant current at the secondary side.

The control of the constant output current of the constant current switch mode power supply control circuit according to the present invention is a self-adapted close loop negative feedback control method, that is, the amplitude of the generated current reference signal is controlled by the average current loop. However, the generated current reference signal may affect the signal input to the average current loop and thereby affecting the output of the average current loop. In the case where the external condition of the switch mode power supply changes, when the input voltage changes or the output voltage changes, the output of the average current loop changes, which thus changes the amplitude of the current reference signal. Balance is achieved after a negative feedback and the constant current output is achieved again. By using the primary-side current to follow the generated current reference signal, high power factor can be obtained. The constant current switch mode power supply control circuit and method thereof according to the present invention does not require sampling and holding the primary-side current and eliminates the error introduced by the sampling and holding. Thus, the accuracy of the output constant current is improved. In addition, compared with the constant power method utilizing the voltage feed-forward approach, the current reference according to the present invention is self-adapted. The accuracy of the constant current is not affected by the multiplier. During phase-controlled dimming, the current reference may be obtained directly based on the cutting phase without the involvement of the multiplier. Therefore, the input power is not affected by the cutting phase and thus no extra control cost is required. In addition, the constant current switch mode power supply control circuit according to the present invention may be integrated as a single chip.

DETAILED DESCRIPTION

Detailed description will be made to the present invention in conjunction with the specific embodiments and the drawings.

Figure 1:
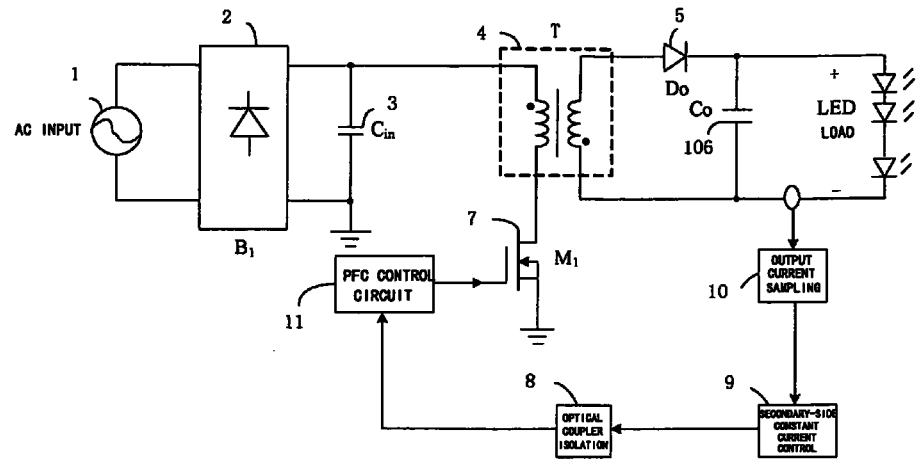
FIG. 1 illustrates a schematic of a conventional single-stage power factor correction circuit relating to the secondary constant current.
Figure 2:
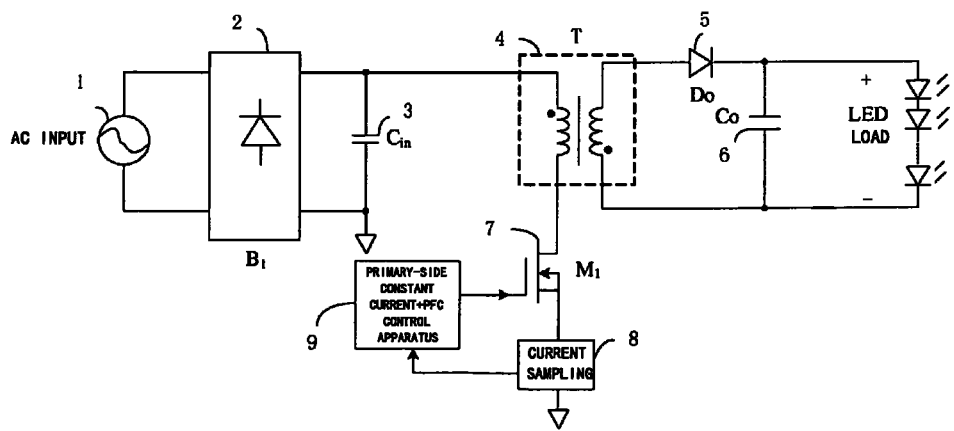
FIG. 2 illustrates a schematic of a primary-side controlled constant current circuit with high power factor.
Figure 3:
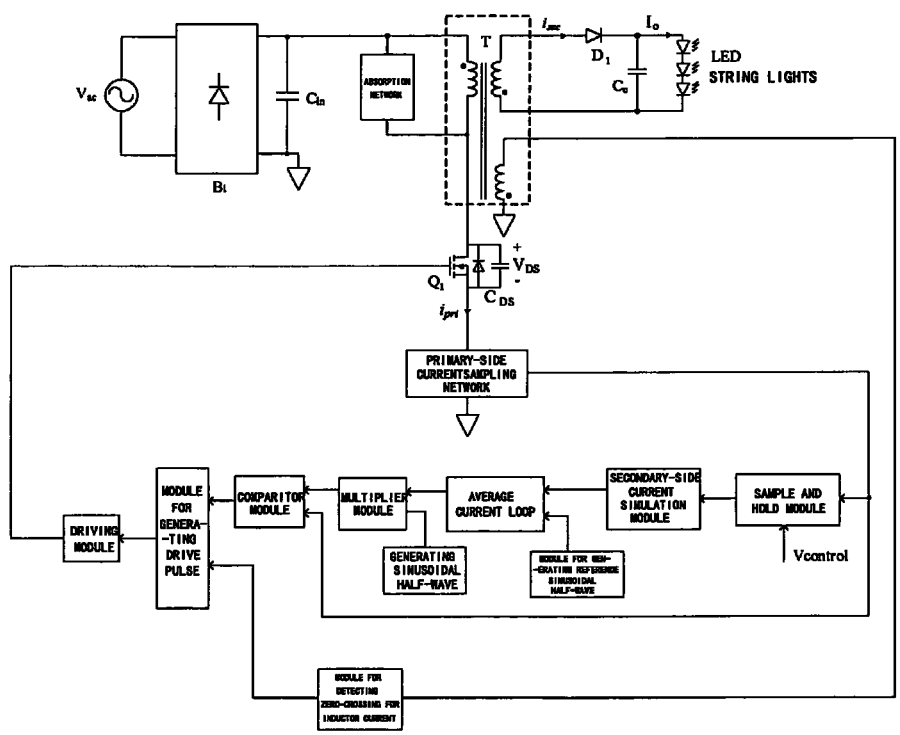
FIG. 3 illustrates a schematic of a conventional primary-side controlled constant current switch mode power supply and its control circuit.
Figure 4:
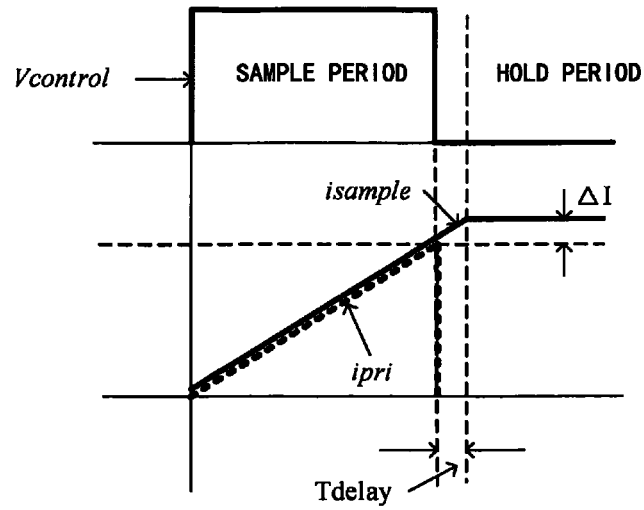
FIG. 4 illustrates a diagram showing the sample error introduced by the sample and hold circuit.
Figure 5:
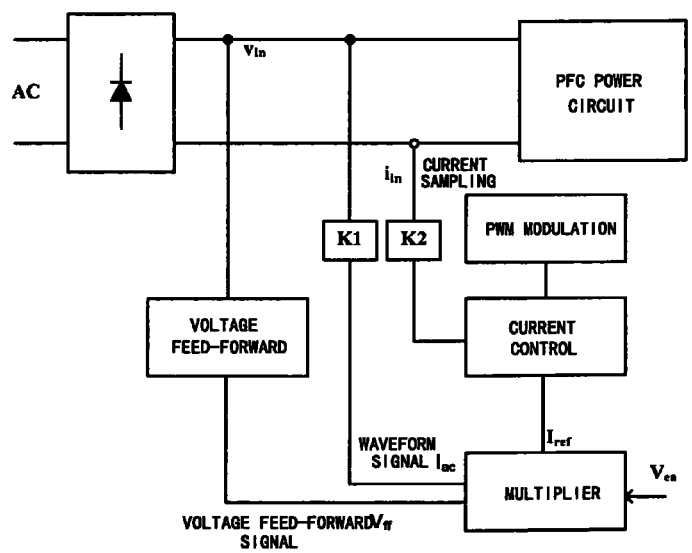
FIG. 5 illustrates a primary-side controlled constant current output PFC circuit based on the constant power principle.
Figure 6A:
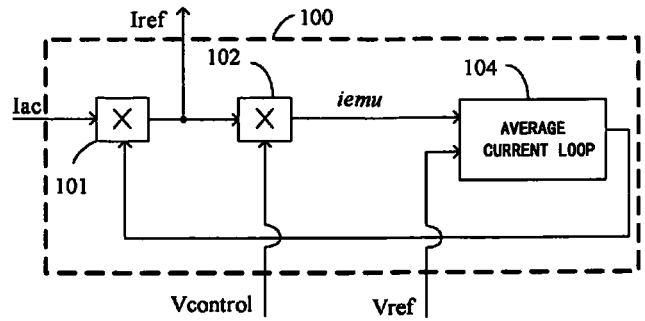
FIG. 6A and FIG. 6B illustrates a current reference generating circuit according to the present invention.

As shown in FIG. 6A, the current reference generating circuit 100 includes:

a first multiplier module 101, configured to receive a rectified voltage waveform signal Iac generated by a rectifier bridge in a main circuit of a switch mode power supply and an amplified error signal Vcomp generated by an average current loop 104, and to generate a sinusoidal half-wave signal Iref. The sinusoidal half-wave signal Iref has the same frequency and phase with the rectified voltage waveform signal Iac. The amplitude of the sinusoidal half-wave signal Iref varies with the amplified error signal Vcomp. The sinusoidal half-wave signal Iref serves as a reference signal which is followed by the primary-side current signal of main circuit of the switch mode power supply.

a second multiplier module 102, configured to receive the sinusoidal half-wave signal Iref and a control signal Vcontrol to generate a pulse signal "iemu", wherein the control signal Vcontrol is a pulse signal indicative of a conduct time of an output diode in the main circuit of the switch mode power supply. An amplitude envelope of the pulse signal "iemu" is a sinusoidal half-wave signal having the same frequency and phase with the sinusoidal half-wave signal Iref and having amplitude in proportion with that of the sinusoidal half-wave signal Iref. A pulse width of the pulse signal "iemu" equals a pulse width of the control signal Vcontrol.

The average current loop 104 is configured to receive the pulse signal "iemu" and an average current loop reference signal Vref. The average current loop 104 compares the average of the switching period of the pulse signal "iemu" with the predetermined average current loop reference signal Vref and output the amplified error signal Vcomp.

Further, the average current loop 104 has a certain filtering function, which filters the pulse signal "iemu" to obtain the average of the switching period of the pulse signal "iemu".

Figure 6B:
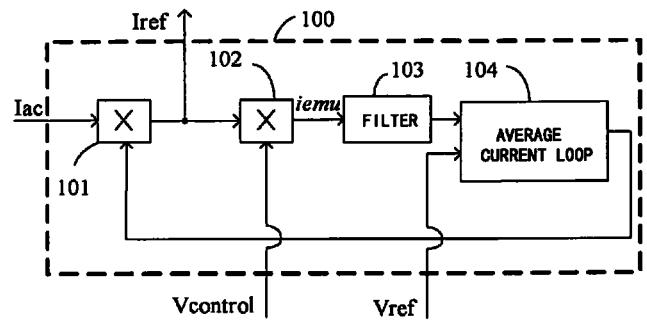

In addition, if the average current loop 104 does not have the filtering function or directly filters the "iemu" and feeds the filtered "iemu" to the average current loop, the current reference generating circuit 100 may further include a filter 103 as shown in FIG. 6B. The filter filters the pulse signal "iemu" to remove the high frequency harmonics so as to generate the average of the switching period of the pulse signal "iemu" which is then fed to the average current loop.

Further, the waveform of the pulse control signal "iemu" reflects a double of the output diode current. The amplitude of the pulse control signal "iemu" reflects that of a primary-side current signal. Therefore, constant output current can be realized by utilizing the average current loop to control the average of the switching period of the pulse control signal "iemu" to be constant.

The main circuit of the switch mode power supply operates at a discontinuous current mode or at a critical discontinuous current mode.

Figure 7:
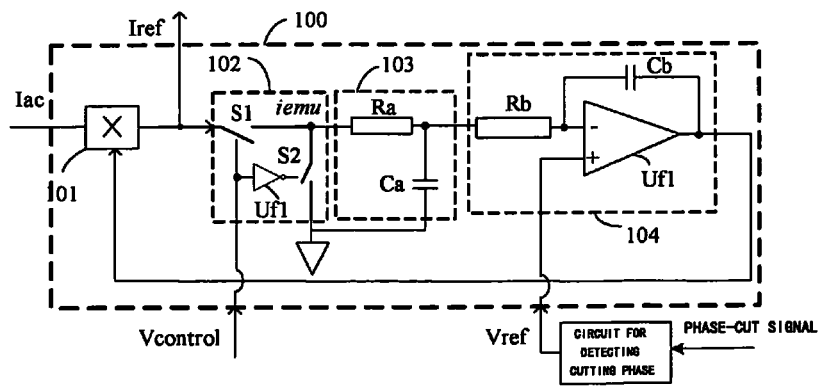
FIG. 7 illustrates a current reference generating circuit according to one embodiment of the present invention.

The second multiplier module 102 is a multiplier or an equivalent thereof, as shown in FIG. 7.

The control signal Vcontrol comes from an auxiliary winding of the transformer of the switch mode power supply or a gate control signal of the switch mode power supply.

The amplitude of the control signal Vcontrol is constant.

The positive pulse width of the control signal Vcontrol equals the conduct time of the output diode in the main circuit of the switch mode power supply.

The average current loop includes an error amplifier and a compensation network, as illustrated in FIG. 7.

The average current loop reference signal Vref is a DC reference signal.

The average current loop reference signal Vref is a pulse signal indicative of the phase controlled dimming phase during phase controlled dimming, as shown in FIG. 7.

Figure 8:
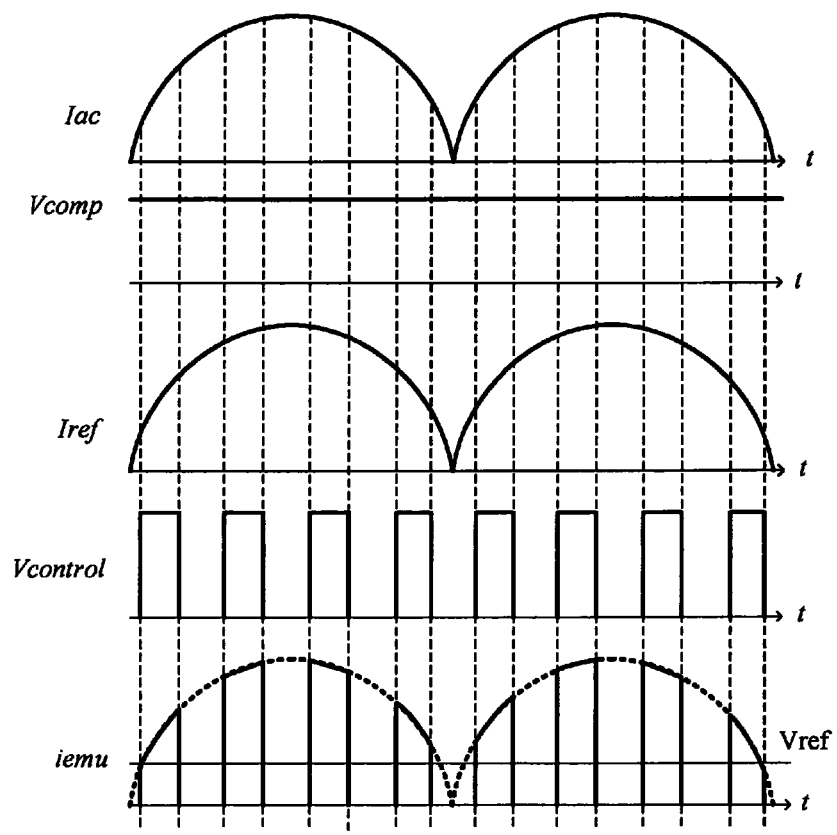
FIG. 8 illustrates a key waveform regarding the circuit shown in FIG. 6A and FIG. 6B.
Figure 9:
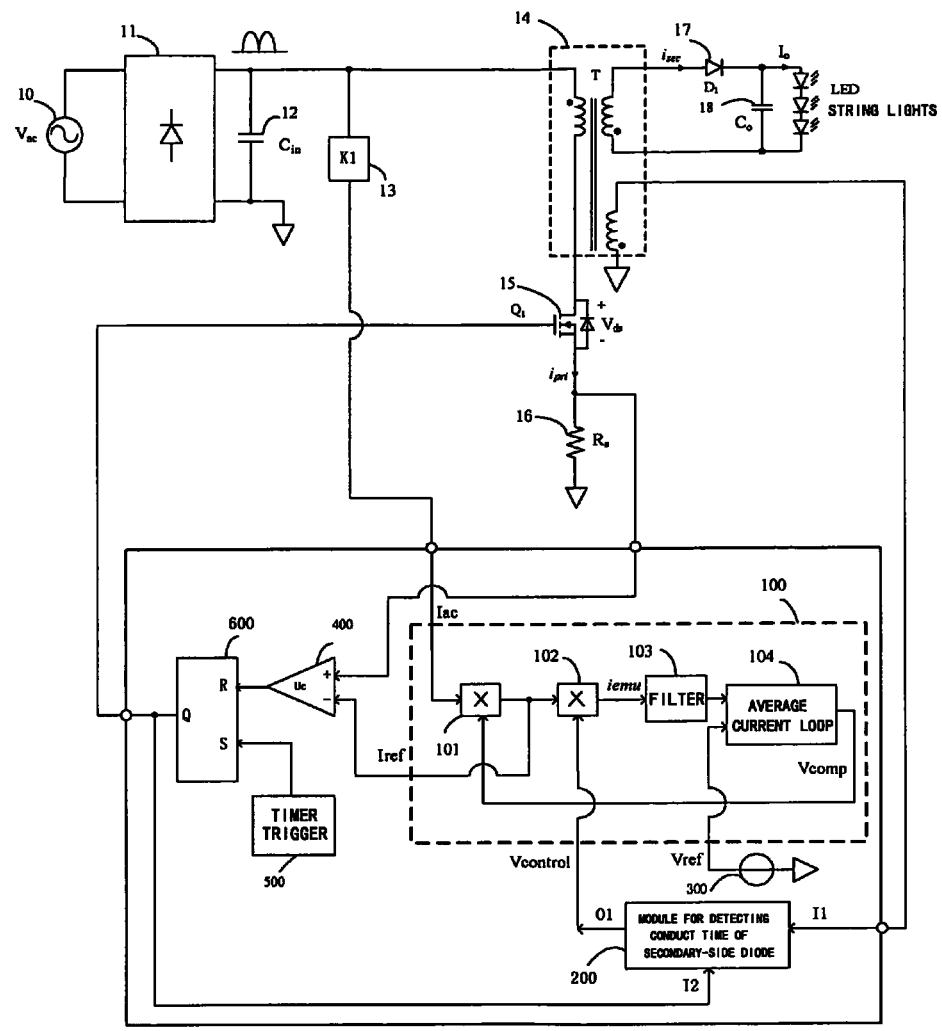
FIG. 9 illustrates a specific embodiment in which a primary-side controlled control circuit with high power factor and constant frequency based on the current reference generating circuit of the present invention is applied to the flyback constant current switch mode power supply.

FIG. 8 is a key waveform regarding the circuit shown in FIG. 6. Iac is the rectified voltage waveform signal generated by the rectifier bridge in the main circuit of the switch mode power supply. Vcomp is an amplified error signal generated by the average current loop 104. Iref is a sinusoidal half-wave signal generated by the first multiplier 101. Vcontrol is a pulse signal indicative of the conduct time of the output diode in the main circuit of the switch mode power supply. "iemu" is a pulse signal generated by the second multiplier. "Vref" is the average current loop reference signal. FIG. 9 illustrates a specific embodiment in which a primary-side controlled constant current switch mode power supply control circuit with high power factor and constant frequency based on the current reference generating circuit is applied to the flyback constant current switch mode power supply, where the flyback switch mode power supply operates in the discontinuous current mode.

The switch mode power supply includes a main circuit and a primary-side controlled constant current switch mode power supply control circuit. The main circuit includes an AC input 10, a rectifier bridge 11, an input capacitor 12, a circuit for sampling voltage waveform of the rectifier bridge 13, a transformer 14, a primary-side switch transistor 15, a sample resistor 16, an output diode 17 and an output capacitor 18. The control circuit includes a current reference generating circuit 100, a module for detecting conduct time of the output diode 200, an average current loop reference 300, a comparator 400, a timer trigger 500 and an RS Flip-flop 600 and a terminal for sampling the primary-side current, a terminal for detecting the conduction time of the output diode, a terminal for detecting the voltage waveform signal of the rectifier bridge and a driving terminal.

The primary-side controlled constant current switch mode power supply control circuit has the following structure. An input terminal I1 of the module for detecting the conduct time of the output diode 200 is coupled to the terminal for detecting the conduction time of the output diode. The other input terminal I2 of the module for detecting the conduct time of the output diode 200 is coupled to an output terminal Q of the RS Flip-flop 600. An output terminal O1 of the module for detecting the conduct time of the output diode 200 is coupled to the Vcontrol terminal of the current reference generating circuit 100. The negative terminal of the comparator 400 is coupled to the output terminal Iref of the current reference generating circuit 100. The positive input of the comparator 400 is coupled to the terminal for sampling the primary-side current. The output of the comparator 400 is coupled to the R terminal (reset terminal) of the RS Flip-flop 600. The output of the timer trigger 500 is coupled to the S terminal (set terminal) of the RS Flip-flop 600. The output terminal Q of the RS Flip-flop 600 is coupled to the driving terminal. The Iac terminal of the current reference generating circuit 100 is coupled to the terminal for detecting the voltage waveform signal of the rectifier bridge. The internal modules in the current reference generating circuit 100 have been discussed above. The Vref terminal of the current reference generating circuit 100 is coupled to the average current loop reference 300.

The main circuit has the following structure. The two AC inputs 10 are coupled to the two inputs of the rectifier bridge 11. The positive output of the rectifier bridge 11 is coupled to a terminal of the input capacitor 12, a terminal of the circuit for sampling voltage waveform of the rectifier bridge 13 and an in-phase terminal of the primary winding of the transformer 14. The negative output of the rectifier bridge 11 is grounded. The other terminal of the input capacitor 12 is grounded. The other terminal of the circuit for sampling voltage waveform of the rectifier bridge 13 is coupled to the terminal for detecting the voltage waveform signal of the rectifier bridge in the control circuit. The anti-phase terminal of the primary winding of the transformer 14 is coupled to the drain of the primary-side switch transistor 15. The source of the primary-side switch transistor 15 is coupled to a terminal of the sample resistor 16 and the terminal for sampling the primary-side current of the control circuit. The other terminal of the sample resistor 16 is grounded. The anti-phase terminal of the secondary winding of the transformer 14 is coupled to the positive terminal of the output diode 17. The negative terminal of the output diode 17 is coupled to the positive terminal of the output capacitor 18. The in-phase terminal of the secondary winding of the transformer 14 is coupled to the negative terminal of the output capacitor 18. The in-phase terminal of the auxiliary winding of the transformer 14 is grounded. The anti-phase terminal of the auxiliary winding of the transformer 14 is coupled to the terminal for detecting the conduct time of the output diode in the control circuit. The gate of the primary-side switch transistor 15 is coupled to the driving terminal of the control circuit.

Figure 10:
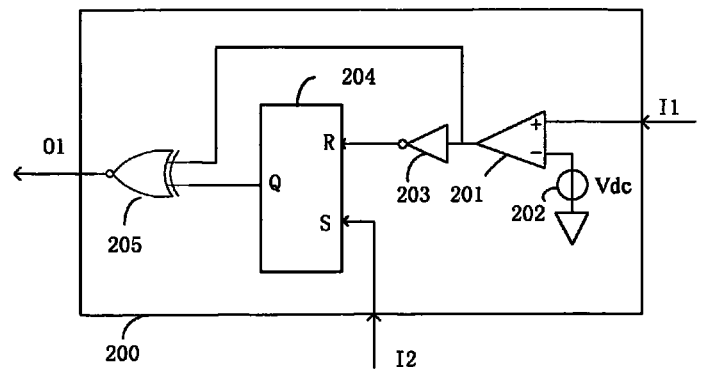
FIG. 10 illustrates a module for detecting conduct time of an output diode in the circuit shown in FIG. 9 according to one embodiment of the present invention.
Figure 11:
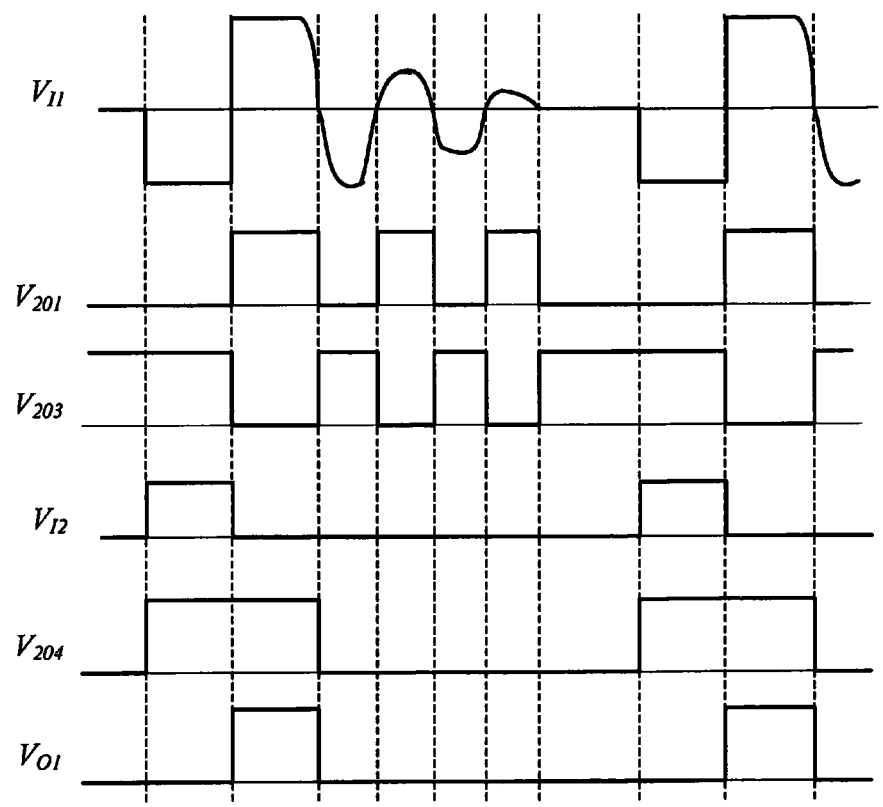
FIG. 11 illustrates a key waveform regarding the circuit shown in FIG. 10.

FIG. 10 illustrates the module 200 for detecting the conduct time of the output diode according to one embodiment. The module 200 includes a comparator 201, a bias reference 202, an inverter 203, an RS Flip-flop 204 and an XOR gate 205. The positive input terminal of the comparator 201 is coupled to an input terminal I1 of the module 200 for detecting the conduct time of the output diode. The negative input terminal of the comparator 201 is coupled to the bias reference 202. The output terminal of the comparator 201 is coupled to the input terminal of the inverter 203. The output terminal of the inverter 203 is coupled to the R terminal (reset terminal) of the RS Flip-flop 204 and an input terminal of the XOR gate 205, respectively. The S terminal (set terminal) of the RS Flip-flop 204 is coupled to the other input terminal 12 of the module 200 for detecting the conduct time of the output diode. The output terminal Q of the RS Flip-flop 204 is coupled to the output terminal O1 of the module 200 for detecting the conduct time of the output diode. FIG. 11 illustrates a key waveform of the module 200 for detecting the conduct time of the output diode according to the embodiments shown in FIG. 10. VI1 is a waveform signal of the input terminal 11. FIG. 11 illustrates the waveform in the case where the input terminal I1 is coupled to the anti-phase terminal of the auxiliary winding of the main circuit. V201 is an output waveform signal of the comparator 201. V203 is the output waveform signal of the inverter 203. VI2 is the input signal of the input terminal 200, which is identical with the gate driving signal for the primary-side switch transistor in the main circuit. V204 is the output waveform signal of the RS Flip-flop 204. V01 is the output signal of the XOR gate 205. As can be seen from the waveform shown in FIG. 11, the module for detecting the conduct time of the output diode shown in FIG. 10 can be used to detect the range of the high voltage at the anti-phase terminal of the auxiliary winding in the main circuit so as to detect the time period of the conduct time for the output diode in the main circuit.

Figure 12:
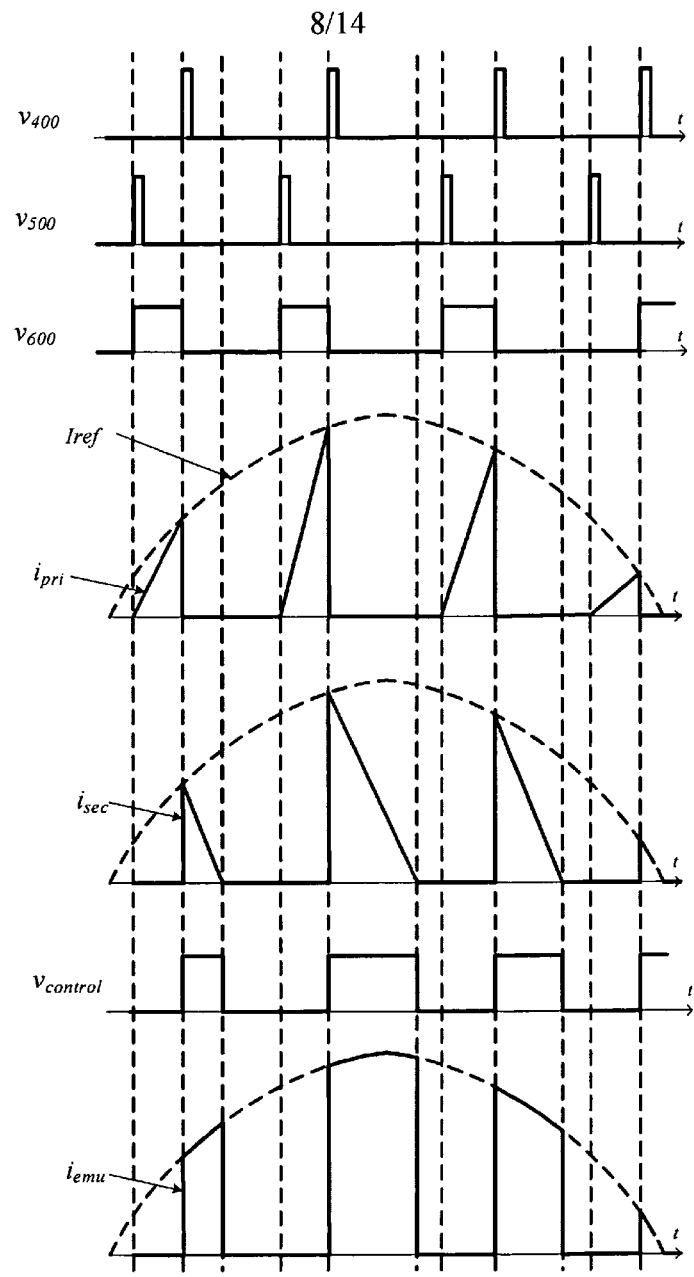
FIG. 12 illustrates a key waveform regarding the circuit shown in FIG. 9.

FIG. 12 illustrates the key waveform regarding the circuit shown in FIG. 9. Where V400, the output waveform of the comparator 300, is a reset signal for the drive pulse of the primary-side switch transistor 15. V500, the output waveform of the timer trigger 500, is a set signal for the drive pulse of the primary-side switch transistor 15. V600, the output waveform of the RS Flip-flop 600, is the drive pulse signal of the primary-side switch transistor 15. "ipri" is the waveform of the primary-side current in the main circuit. "isec" is the current waveform of the output diode in the main circuit. "Iref" is the output waveform of the first multiplier 101. Vcontrol is the output waveform of the module 200 for detecting the conduct time of the output diode. "iemu" is the output waveform of the second multiplier 102. The principle of the circuit is described below. (1) the circuit 13 for sampling the output voltage of the rectifier bridge 11 generates the waveform signal Iac of the output voltage from the rectifier bridge in the main circuit of the switch mode power supply; (2) the module 200 for detecting the conduct time of the output diode detects positive voltage range for the auxiliary winding of the transformer 14 to obtain the signal Vcontrol indicative of the conduct time of the output diode; (3) the above two signals Iac and Vcontrol are fed to the primary-side current reference generating circuit 100 of the primary-side controlled constant current switch mode power supply according to the present invention, to generate the self-adapted reference signal Iref for the primary-side current; (4) the comparator 400 compares the primary-side current through the sample resistor 16 to the current reference Iref to generate the reset signal for the primary-side driving signal. That is, when the primary-side current flowing through the sample resistor 16 rises to reach the amplitude of the current reference Iref, the output signal of the comparator 400 is set from a low voltage level to a high voltage level. The hop signal, which is then fed to the reset terminal of the RS Flip-flop 600, is used to reset the output pulse generated by the RS Flip-flop 600; (5) the rising edge of the narrow pulse generated by the timer trigger 500 is used to set the output pulse generated by the RS Flip-flop 600. Therefore, the output pulse is a pulse signal with a constant frequency.

As can be seen from the foregoing, when the input condition or output condition of the main circuit of the switch mode power supply changes, average current loop is configured to automatically adjust the primary-side current reference signal Iref so that the output current remains unchanged, thereby realizing the constant current output. Assume the input voltage is $V_{ac}=V_{pk}\sin\omega t$, $I_{ref}=I_{pk}|\sin\omega t|$, then, the duty cycle for the switch mode power supply is derived as follows:

$$D = \frac{L_m f \cdot I_{pk}|\sin\omega t|}{V_{pk}|\sin\omega t|} = \frac{L_m f \cdot I_{pk}}{V_{pk}} \quad (1)$$

where $L_m$ is the magnetizing inductance of the transformer 14 and f is the working frequency of the switch mode power supply, which is also the frequency of the output pulse of the RS Flip-flop 600. $\omega$ is the angular frequency of the input AC voltage, wherein $\omega=2\pi f_{line}$. $f_{line}$ is the frequency of the input AC voltage. As can be seen from Equation (1), in the case of the specific input voltage and output current, the duty cycle D is a constant. The average switching period of the input AC current can be obtained as follows:

$$|I_{in\_avg}| = \frac{1}{2}I_{ref}D = \frac{1}{2}\frac{D^2 V_{pk}|\sin\omega t|}{L_m f} \quad (2)$$

Figure 13:
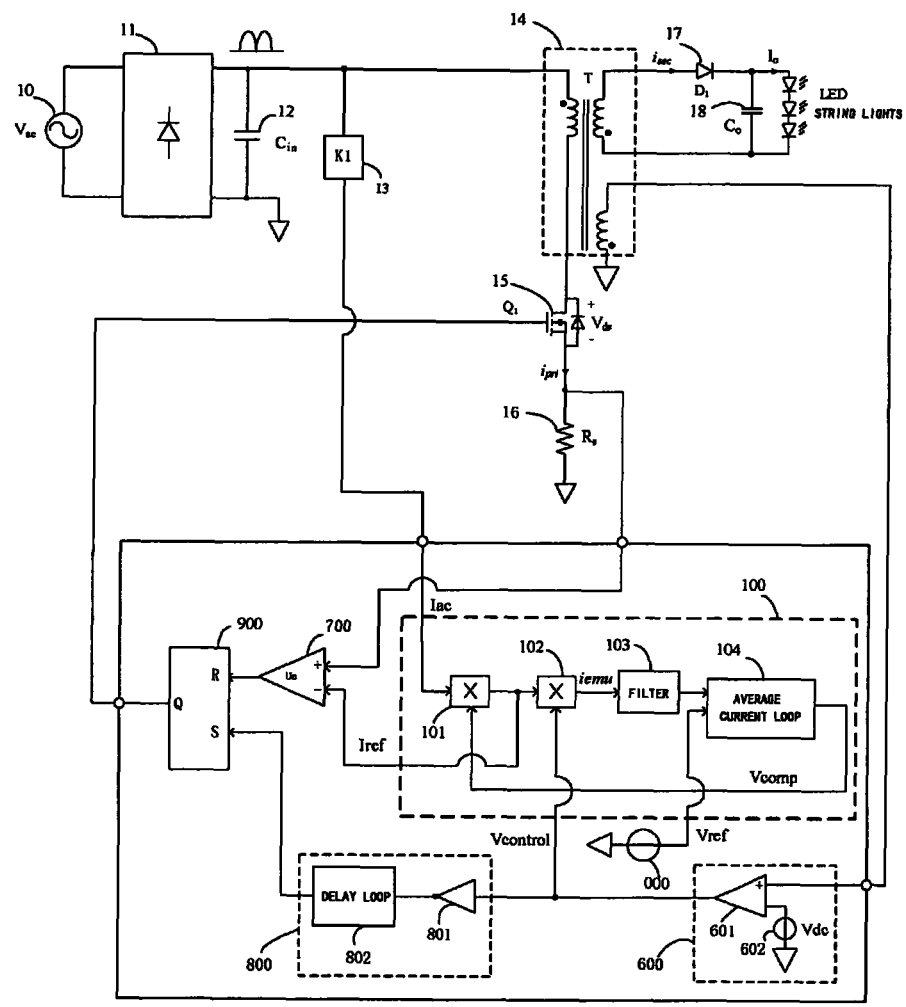
FIG. 13 illustrates a specific embodiment in which a primary-side controlled control circuit with high power factor and variant frequency based on the current reference generating circuit 100 of the present invention is applied to the flyback constant current switch mode power supply.

As can be seen from Equation (2), the input AC current waveform of the switch mode power supply is a pure sinusoidal signal which may result in a very high power factor. FIG. 13 illustrates a specific embodiment in which a primary-side controlled control circuit with high power factor and variant frequency based on the current reference generating circuit 100 is applied to the flyback constant current switch mode power supply, where the flyback switch mode power supply operates in the critical discontinuous current mode, i.e., quasi-resonant mode. The control circuit includes an average current reference 000, a current reference generating circuit 100 according to the present invention, a module 600 for detecting conduct time of the output diode, a comparator 700, an inverter module 800, an RS Flip-flop 900 and a terminal for sampling the primary-side current, a terminal for detecting the conduction time of the output diode, a terminal for detecting the voltage waveform signal of the rectifier bridge and a driving terminal. The main circuit includes an AC input 10, a rectifier bridge 11, an input capacitor 12, a circuit 13 for sampling the voltage waveform of the rectifier bridge, a transformer 14, a primary-side switch transistor 15, a sample resistor 16, an output diode 17 and an output capacitor 18. The control circuit has the following structure. The module for detecting conduct time of the output diode 600 includes a comparator 601 and a comparator reference 602. The positive input terminal of the comparator 601 is coupled to the terminal for detecting the conduct time of the output diode. The negative input terminal of the comparator 601 is coupled to a terminal of the comparator reference 602. The other terminal of the comparator reference 602 is grounded. As the output of the module for detecting conduct time of the output diode 600, the output of the comparator 601 is coupled to the Vcontrol terminal of the current reference generating circuit 100 and the input terminal of the inverter module 800. A positive input terminal of the comparator 700 is coupled to the terminal for sampling the primary-side current. A negative input terminal of the comparator 700 is coupled to Iref terminal of the current reference generating circuit 100. The output of the comparator 700 is coupled to the R terminal (reset terminal) of the RS Flip-flop 900. The Iac terminal of the current reference generating circuit 100 is coupled to the terminal for detecting the voltage waveform signal of the rectifier bridge. The inverter module 800 includes an inverter 801 and a delay loop 802. The input terminal of the inverter 801 is the input terminal of the inverter module 800. The output terminal of the inverter 801 is coupled to the input terminal of the delay loop 802. The output terminal of the delay loop 802 is the output terminal of the inverter module 800. The output of the inverter module 800 is coupled to the S terminal (set terminal) of the RS Flip-flop 900. The output Q of the RS Flip-flop 900 is coupled to the driving terminal. The Vref terminal of the current reference generating circuit 100 is coupled to the average current loop reference 000. The main circuit has the following structure. The two terminals of the AC inputs 10 are coupled to the two inputs of the rectifier bridge 11. The positive output of the rectifier bridge 11 is coupled to a terminal of the input capacitor 11, a terminal of the circuit for sampling voltage waveform of the rectifier bridge 13 and an in-phase terminal of the primary winding of the transformer 14. The negative output of the rectifier bridge 11 is grounded. The other terminal of the input capacitor 11 is grounded. The other terminal of the circuit for sampling voltage waveform of the rectifier bridge 13 is coupled to the terminal for detecting the voltage waveform signal of the rectifier bridge in the control circuit. The anti-phase terminal of the primary winding of the transformer 14 is coupled to the drain of the primary-side switch transistor 15. The source of the primary-side switch transistor 15 is coupled to a terminal of the sample resistor 16 and the terminal for sampling the primary-side current of the control circuit. The other terminal of the sample resistor 16 is grounded. The anti-phase terminal of the secondary winding of the transformer 14 is coupled to the positive terminal of the output diode 17. The negative terminal of the output diode 17 is coupled to the positive terminal of the output capacitor 18. The in-phase terminal of the secondary winding of the transformer 14 is coupled to the negative terminal of the output capacitor 18. The in-phase terminal of the auxiliary winding of the transformer 14 is grounded. The anti-phase terminal of the auxiliary winding of the transformer 14 is coupled to the terminal for detecting the conduct time of the output diode in the control circuit.

Figure 14:
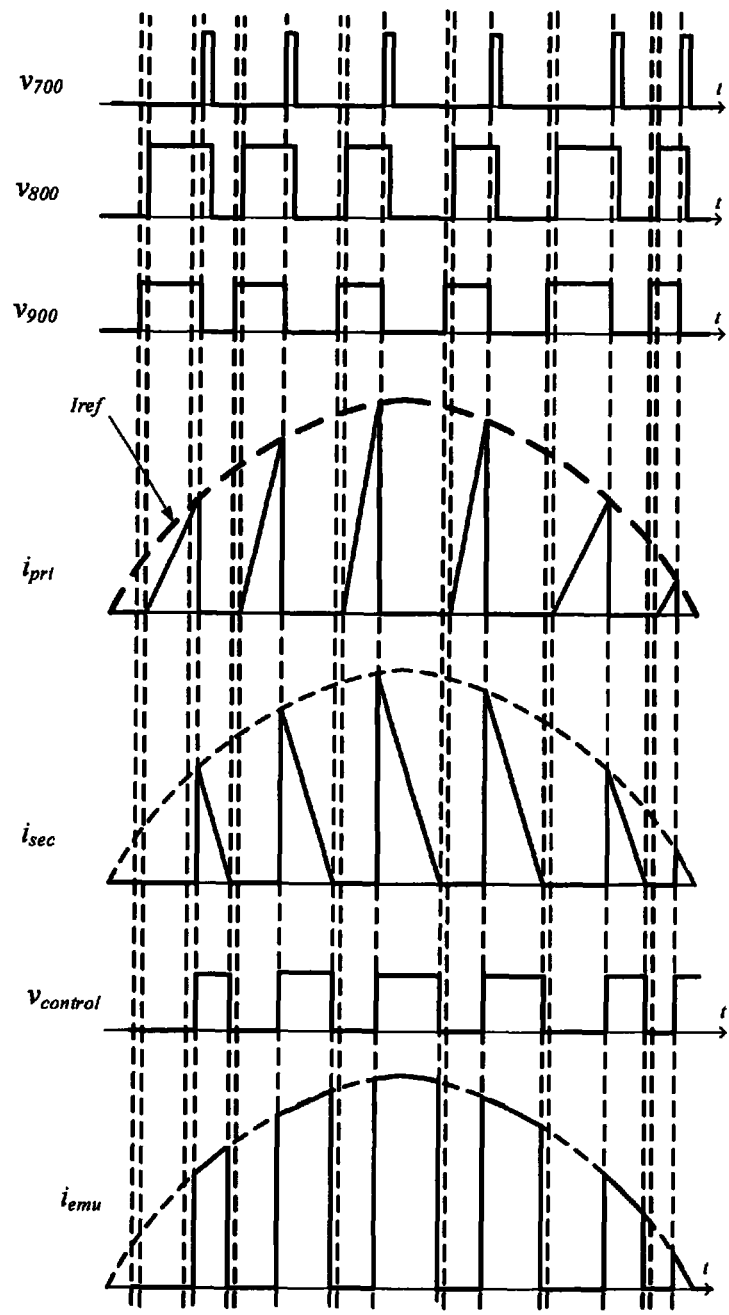
FIG. 14 illustrates a key waveform regarding the circuit shown in FIG. 13.
Figure 15:
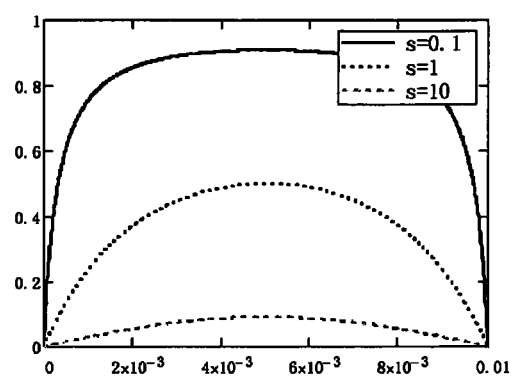
FIG. 15 illustrates a normalized output current calculating waveform during half period of the input AC power frequency regarding the circuit shown in FIG. 13.

FIG. 14 illustrates the key waveform of the circuit shown in FIG. 13. V700, the output waveform of the comparator 700, is a reset signal for the drive pulse of the primary-side switch transistor 15. V800, the output waveform of the inverter module 800, is a set signal for the drive pulse of the primary-side switch transistor 15. V900, the output waveform of the RS Flip-flop 900, is the drive pulse signal of the primary-side switch transistor 15. "ipri" is the primary-side current waveform in the main circuit. "isec" is the current waveform of the output diode in the main circuit. "Iref" is the output waveform of the first multiplier 101. Vcontrol is the output waveform of the module 600 for detecting the conduct time of the output diode. "iemu" is the output waveform of the second multiplier 102. The principle of the circuit is described below. (1) the circuit 13 for sampling the output voltage of the rectifier bridge 11 generates a waveform signal Iac of the output voltage from the rectifier bridge in the main circuit of the switch mode power supply; (2) the module 200 for detecting the conduct time of the output diode detects a positive voltage range for the auxiliary winding of the transformer 14 to obtain the signal Vcontrol indicative of the conduct time of the output diode; (3) the above two signals Iac and Vcontrol are fed to the primary-side current reference generating circuit 100 of the primary-side controlled constant current switch mode power supply according to the present invention, to generate the self-adapted reference signal Iref for the primary-side current; (4) the comparator 300 compares the primary-side current through the sample resistor 16 to the current reference Iref to generate a reset signal for the primary-side driving signal. That is, when the primary-side current of the sample resistor 16 rises to reach the amplitude of the current reference Iref, the output signal of the comparator 700 is set from a low voltage level to a high voltage level. The hop signal, which is then fed to the reset terminal of the RS Flip-flop 900, is used to reset the output pulse generated by the RS Flip-flop 900; (5) the zero-crossing point of the voltage of the auxiliary winding of the transformer 14 is detected in order to detect the zero-crossing point of the current waveform of the output diode. By virtue of the delay loop, a set signal for the output pulse generated by the RS Flip-flop 900 is generated. Thus, the valley of the primary-side switch transistor 15 is formed. That is, the circuit operates at the quasi-resonant mode. Therefore, the drive pulse of the primary-side switch transistor 15 is a frequency variant pulse signal. In the embodiment shown in FIG. 13, the absolute value of the input current of the main circuit can be expressed as:

$$|I_{in\_avg}| = \frac{1}{2}I_{pk}|\sin\omega t|D = \frac{1}{2}\frac{kV'_o V_{pk}|\sin\omega t|}{V'_o + V_{pk}|\sin\omega t|} \quad (3)$$

where $V'_o$ denotes a corresponding primary-side voltage of transformer when the output voltage is converted to the primary-side voltage. k denotes a coefficient indicating the relation between current and voltage. D denotes a duty cycle, which is the ratio of the conduct time to the switching period. Ipk is the primary-side current peak of the main circuit. Vpk is the input AC voltage peak. FIG. 15 illustrates a normalized output current waveform during half period of the input AC power frequency based on Equation (3), where s=Vo'/Vac. As can be seen, the input AC current waveform approximates a sinusoidal signal. However, as "s" becomes smaller, i.e., the amplitude of the input voltage increases, the waveform of the input current becomes distorted increasingly and the power factor become lower.

Figure 16:
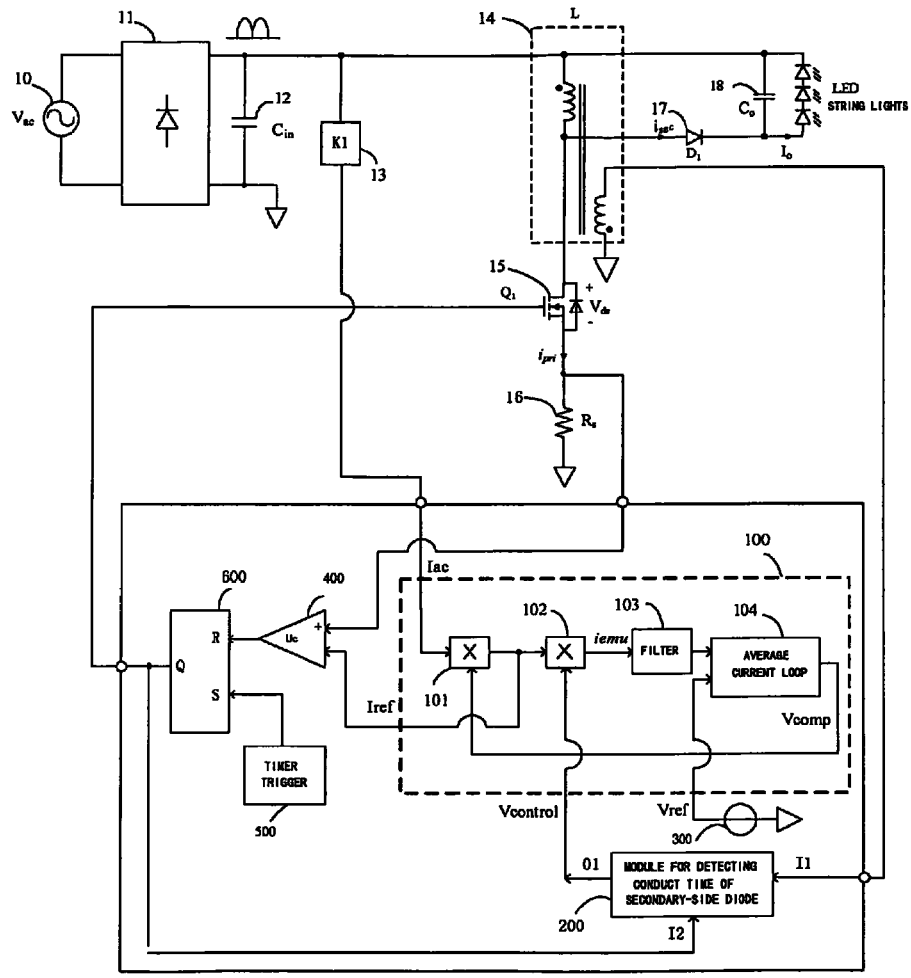
FIG. 16 illustrates a specific embodiment in which the present invention is applied to a non-isolating type buck-boost constant current switch mode power supply with constant frequency and high power factor.
Figure 17:
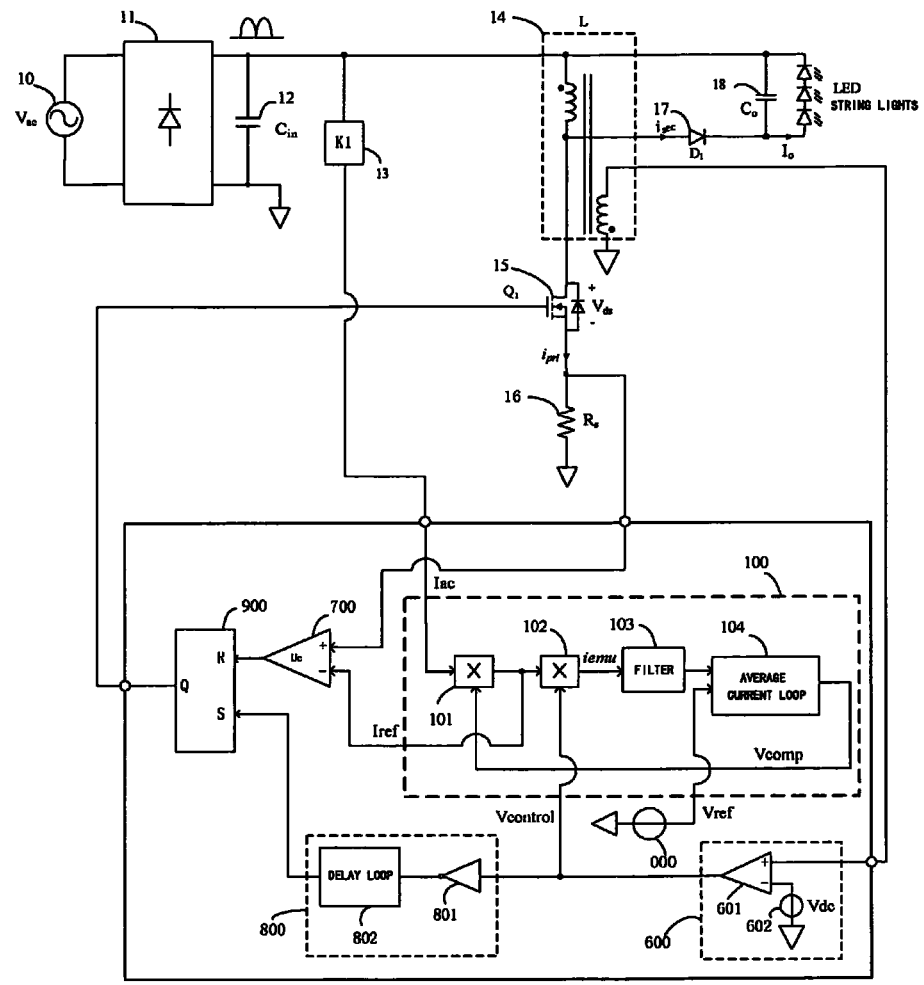
FIG. 17 illustrates a specific embodiment in which the present invention is applied to a non-isolating type buck-boost constant current switch mode power supply with variant frequency and high power factor.

The present invention is not only applicable to an isolating-type topology as shown in FIG. 9 and FIG. 13, but also applicable to a non-isolating-type topology. FIG. 16 is a specific embodiment in which the present invention is applied to a non-isolating type buck-boost constant current switch mode power supply with constant frequency and high power factor. The control circuit is identical with the one shown in FIG. 9. The difference between the main circuit in FIG. 16 and the main circuit in FIG. 9 lies in that an inductor 14 is used in FIG. 16 to replace the transformer 14 shown in FIG. 9. The working principle is the same as that of FIG. 9. FIG. 17 is a specific embodiment in which the present invention is applied to a non-isolating type buck-boost constant current switch mode power supply with variant frequency and high power factor. The control circuit is identical with the one shown in FIG. 13. The difference between the main circuit in FIG. 17 and the main circuit in FIG. 13 lies in that an inductor 14 is used in FIG. 17 to replace the transformer 14 shown in FIG. 13. The working principle is the same as that of FIG. 13.

Figure 18:
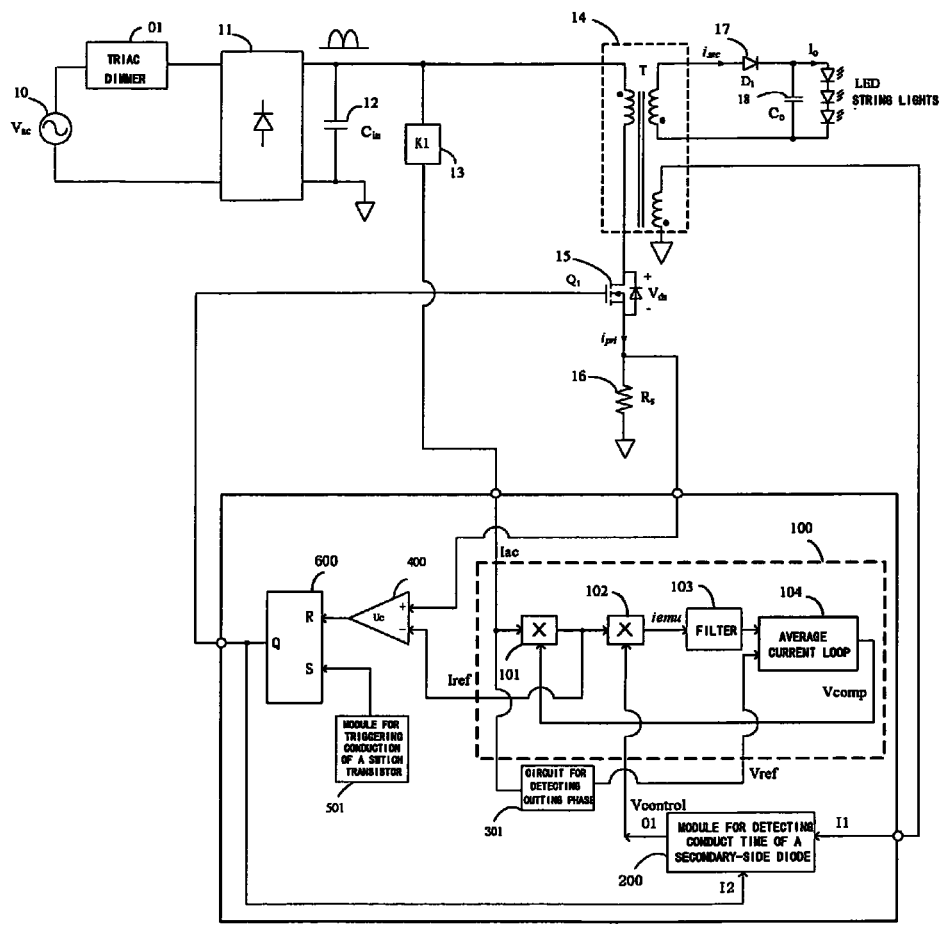
FIG. 18 is a dimmable flyback primary-side controlled constant current switch mode power supply with high power factor when the present invention is in combination with a TRIAC dimming circuit.

FIG. 18 is a dimmable flyback primary-side controlled constant current switch mode power supply with high power factor when the present invention is in combination with a TRIAC dimming circuit. The structure of the circuit shown in FIG. 18 is similar to the one shown in FIG. 9. The difference is that TRIAC dimmer is added between the AC input 10 and the rectifier bridge 11 in the main circuit shown in FIG. 18 and a circuit for detecting cutting phase 301 replaces the average current loop reference 300 shown in FIG. 9. A module 501 for triggering the conduction of the switch transistor replaces the timer trigger shown in FIG. 9. The input terminal of the circuit for detecting cutting phase 301 is coupled to the terminal for detecting voltage waveform signal of the rectifier bridge. The output terminal of the circuit for detecting cutting phase 301 is coupled to the Vref terminal of the current reference generating circuit 100. During dimming, the circuit for detecting cutting phase 301 detects a phase-cut signal of the terminal for detecting voltage waveform signal of the rectifier bridge and transforms it to a pulse signal with a constant amplitude and a duty cycle indicative of the cutting phase, and feeds it to the current reference generating circuit 100 to serve as the reference for the average current loop. Thus, the output current can be adjusted and dimming function can be achieved. The module 501 for triggering the conduction of the switch transistor is used to control the conduction of the primary-side switch transistor. The module 501 for triggering the conduction of the switch transistor corresponds to the timer trigger 500 in FIG. 9. FIG. 13 includes a module 600 for detecting conduct time of the output diode and an inverter module 800.

It is appreciated by those skilled in the art that the components such as the specific multiplier module and the average current loop as described in the present invention may be implemented in various ways or may be implemented as different embodiments by way of various combinations without departing from the spirit of the present invention. For instance, the multiplier module may be implemented with a combination of switches, which is omitted herein for brevity.

No matter how detailed is the above written description, the present invention may be implemented with many ways. The content described in the specification is merely specific embodiments of the present invention. Any equivalents or modifications made within the spirit of the present invention shall fall within the scope of the present invention.

The above description of the present invention is not meant to be exhaustive or limiting, but rather be described for illustrative purpose. It is appreciated by those skilled in the art that equivalents or modification can be made within the scope of the present invention.

While the foregoing describes specific embodiments of the present invention and describes the desired best mode, the present invention can be implemented with various embodiments regardless how detailed the above description is described. The details of above circuit as well as its control method may be modified during execution. However, these modifications still fall within the scope of the present invention.

It is to be noted that special terms as used in certain features or schemes of the present invention is not meant to be re-defined to limit certain features, characteristics, or schemes of the present invention relating to the terms. In conclusion, the terms used in the annexed claims shall not be construed as limiting to the specific embodiments of the present invention unless these terms are explicitly defined in the above detailed description. Therefore, the actual scope of the present invention includes not only the disclosed embodiments, but also any equivalent schemes within the scope of the claims of the present invention.

What is claimed is:

1. A current reference generating circuit, comprising:
a first multiplier module, configured to receive a rectified voltage waveform signal (Iac) generated by a rectifier bridge in a main circuit of a switch mode power supply and an amplified error signal (Vcomp) generated by an average current loop, and to generate a sinusoidal half-wave signal (Iref), wherein the sinusoidal half-wave signal (Iref) has a same frequency and phase with the rectified voltage waveform signal (Iac), the amplitude of the sinusoidal half-wave signal (Iref) varies with the amplified error signal (Vcomp) generated by the average current loop and the sinusoidal half-wave signal (Iref) serves as a reference signal that is followed by a primary-side current signal in the main circuit of the switch mode power supply;
a second multiplier module, configured to receive the sinusoidal half-wave signal (Iref) and a control signal (Vcontrol) and generate a pulse signal (iemu), wherein the control signal (Vcontrol) is a pulse signal indicative of a conduct time of an output diode in the main circuit of the switch mode power supply, an amplitude envelope of the pulse signal (iemu) is a sinusoidal half-wave having the same frequency and phase with the sinusoidal half-wave signal (Iref) and having an amplitude in direct proportion with that of the sinusoidal half-wave signal (Iref), and a pulse width of the pulse signal (iemu) equals a pulse width of the control signal (Vcontrol);

an average current loop, configured to receive the pulse signal (iemu) and an average current loop reference signal (Vref), wherein the average of the pulse signal (iemu) is compared to the predetermined average current loop reference signal (Vref) and the difference between the average of the pulse signal (iemu) and the predetermined average current loop reference signal (Vref) is amplified by a compensation network in the average current loop and the amplified difference is output as an amplified error signal (Vcomp).

2. The current reference generating circuit of claim 1, wherein the average current loop has a filtering function, which filters the pulse control signal (iemu) to obtain an average of a switching period of the pulse signal (iemu).

3. The current reference generating circuit of claim 1, further comprising a filter, configured to filter out high frequencies in the pulse signal (iemu) to obtain and feed an average of a switching period of the pulse signal (iemu) to the average current loop.

4. The current reference generating circuit of claim 1, wherein the waveform of the pulse signal (iemu) is indicative of a double of the current waveform of the output diode or approximates a double of the current waveform of the output diode and the amplitude of the pulse signal (iemu) is indicative of an amplitude of the primary-side current signal.

5. The current reference generating circuit of claim 1, wherein the second multiplier module is a multiplier or an equivalent circuit module.

6. The current reference generating circuit of claim 1, wherein the control signal (Vcontrol) comes from an auxiliary winding of the transformer of the switch mode power supply or a gate control signal of the switch mode power supply.

7. The current reference generating circuit of claim 1, wherein the amplitude of the control signal (Vcontrol) is constant.

8. The current reference generating circuit of claim 1, wherein a positive pulse width of the control signal (Vcontrol) is the same with the conduct time of the output diode in the main circuit of the switch mode power supply.

9. The current reference generating circuit of claim 1, wherein the second multiplier module is a multiplier or an equivalent circuit module.

10. The current reference generating circuit of claim 1, wherein the average current loop includes an error amplifier and a compensation network.

11. A constant current switch mode power supply control circuit, comprising a current reference generating circuit, a module for detecting conduct time of an output diode, a comparator, a module for controlling conduction of a switch transistor and a RS Flip-flop, wherein
the current reference generating circuit is the current reference generating circuit of claim 1;
the module for detecting conduct time of an output diode is configured to detect the conduct time of the output diode in the main circuit of the switch mode power supply, and output a control signal (Vcontrol) to the current reference generating circuit;
two input terminals of the comparator are configured to receive a sinusoidal half-wave signal Iref generated from the current reference generating circuit and a sampled primary-side current signal, respectively, and the comparator is configured to compare the sinusoidal half-wave signal with the sampled primary-side current signal;
two input terminals of the RS Flip-flop are coupled to an output terminal of the comparator and the module for controlling conduction of a switch transistor, and the RS Flip-flop is configured to generate a trigger signal to a switch transistor in the main circuit;
the module for controlling conduction of a switch transistor is configured to control the conduction of the switch transistor in the main circuit of the switch mode power supply.

12. The control circuit of claim 11, wherein when the sampled primary-side current signal rises to reach the sinusoidal half-wave signal (Iref), the output signal of the comparator flips from a low voltage level to a high voltage level, and then, when the sampled primary-side current signal decreases to be lower than the sinusoidal half-wave signal (Iref), the output signal of the comparator flips from a high voltage level to a low voltage level;
the output terminal of the comparator is coupled to a reset terminal R of the RS Flip-flop, the output of the module for controlling conduction of a switch transistor is coupled to a set terminal S of the RS Flip-flop; when the reset terminal R of the RS Flip-flop detects a rising edge from a low voltage level to a high voltage level, the output signal of the RS Flip-flop is reset from the high voltage level to the low voltage level so as to control the conduction of the switch transistor in the main circuit of the switch mode power supply; when the set terminal S of the RS Flip-flop detects a rising edge from a low voltage level to a high voltage level, the output signal of the RS Flip-flop is set from a low voltage level to a high voltage level; the above operations repeats again and again and the RS Flip-flop outputs a pulse sequence signal.

13. The control circuit of claim 11, wherein the module for controlling conduction of a switch transistor is a timer trigger, and the timer trigger is configured to generate a clock signal with constant frequency provided to the RS Flip-flop for controlling the conduction of the switch transistor in the main circuit of the switch mode power supply.

14. The control circuit of claim 11, wherein the module for controlling conduction of a switch transistor comprises a module for detecting conduct time of an output diode, an inverter, a delay circuit; the module for controlling conduction of a switch transistor is configured to generate a pulse signal by detecting the conduct time of the output diode at the secondary side and the pulse signal is inverted and delayed for being provided to the RS Flip-flop in order to control the conduction of the switch transistor in the main circuit of the switch mode power supply.

15. A constant current switch mode power supply control circuit, comprising a current reference generating circuit, a module for detecting conduct time of an output diode, a comparator, a module for controlling conduction of a switch transistor and a RS Flip-flop, wherein
the current reference generating circuit is the current reference generating circuit of claim 2;
the module for detecting conduct time of an output diode is configured to detect the conduct time of the output diode in the main circuit of the switch mode power supply, and output a control signal (Vcontrol) to the current reference generating circuit;
two input terminals of the comparator are configured to receive a sinusoidal half-wave signal Iref generated from the current reference generating circuit and a sampled primary-side current signal, respectively, and the comparator is configured to compare the sinusoidal half-wave signal with the sampled primary-side current signal;

two input terminals of the RS Flip-flop are coupled to an output terminal of the comparator and the module for controlling conduction of a switch transistor, and the RS Flip-flop is configured to generate a trigger signal to a switch transistor in the main circuit;

the module for controlling conduction of a switch transistor is configured to control the conduction of the switch transistor in the main circuit of the switch mode power supply.

16. A constant current switch mode power supply control circuit, comprising a current reference generating circuit, a module for detecting conduct time of an output diode, a comparator, a module for controlling conduction of a switch transistor and a RS Flip-flop, wherein the current reference generating circuit is the current reference generating circuit of claim 3;

the module for detecting conduct time of an output diode is configured to detect the conduct time of the output diode in the main circuit of the switch mode power supply, and output a control signal (Vcontrol) to the current reference generating circuit;

two input terminals of the comparator are configured to receive a sinusoidal half-wave signal Iref generated from the current reference generating circuit and a sampled primary-side current signal, respectively, and the comparator is configured to compare the sinusoidal half-wave signal with the sampled primary-side current signal;

two input terminals of the RS Flip-flop are coupled to an output terminal of the comparator and the module for controlling conduction of a switch transistor, and the RS Flip-flop is configured to generate a trigger signal to a switch transistor in the main circuit;

the module for controlling conduction of a switch transistor is configured to control the conduction of the switch transistor in the main circuit of the switch mode power supply.

17. A constant current switch mode power supply control circuit, comprising a current reference generating circuit, a module for detecting conduct time of an output diode, a comparator, a module for controlling conduction of a switch transistor and a RS Flip-flop, wherein the current reference generating circuit is the current reference generating circuit of claim 4;

the module for detecting conduct time of an output diode is configured to detect the conduct time of the output diode in the main circuit of the switch mode power supply, and output a control signal (Vcontrol) to the current reference generating circuit;

two input terminals of the comparator are configured to receive a sinusoidal half-wave signal Iref generated from the current reference generating circuit and a sampled primary-side current signal, respectively, and the comparator is configured to compare the sinusoidal half-wave signal with the sampled primary-side current signal;

two input terminals of the RS Flip-flop are coupled to an output terminal of the comparator and the module for controlling conduction of a switch transistor, and the RS Flip-flop is configured to generate a trigger signal to a switch transistor in the main circuit;

the module for controlling conduction of a switch transistor is configured to control the conduction of the switch transistor in the main circuit of the switch mode power supply.

18. A constant current switch mode power supply control circuit, comprising a current reference generating circuit, a module for detecting conduct time of an output diode, a comparator, a module for controlling conduction of a switch transistor and a RS Flip-flop, wherein the current reference generating circuit is the current reference generating circuit of claim 5;

the module for detecting conduct time of an output diode is configured to detect the conduct time of the output diode in the main circuit of the switch mode power supply, and output a control signal (Vcontrol) to the current reference generating circuit;

two input terminals of the comparator are configured to receive a sinusoidal half-wave signal Iref generated from the current reference generating circuit and a sampled primary-side current signal, respectively, and the comparator is configured to compare the sinusoidal half-wave signal with the sampled primary-side current signal;

two input terminals of the RS Flip-flop are coupled to an output terminal of the comparator and the module for controlling conduction of a switch transistor, and the RS Flip-flop is configured to generate a trigger signal to a switch transistor in the main circuit;

the module for controlling conduction of a switch transistor is configured to control the conduction of the switch transistor in the main circuit of the switch mode power supply.

19. A constant current switch mode power supply control circuit, comprising a current reference generating circuit, a module for detecting conduct time of an output diode, a comparator, a module for controlling conduction of a switch transistor and a RS Flip-flop, wherein the current reference generating circuit is the current reference generating circuit of claim 6;

the module for detecting conduct time of an output diode is configured to detect the conduct time of the output diode in the main circuit of the switch mode power supply, and output a control signal (Vcontrol) to the current reference generating circuit;

two input terminals of the comparator are configured to receive a sinusoidal half-wave signal Iref generated from the current reference generating circuit and a sampled primary-side current signal, respectively, and the comparator is configured to compare the sinusoidal half-wave signal with the sampled primary-side current signal;

two input terminals of the RS Flip-flop are coupled to an output terminal of the comparator and the module for controlling conduction of a switch transistor, and the RS Flip-flop is configured to generate a trigger signal to a switch transistor in the main circuit;

the module for controlling conduction of a switch transistor is configured to control the conduction of the switch transistor in the main circuit of the switch mode power supply.

20. A method for controlling a constant current switch mode power supply, comprising the steps of:
(1) making a main circuit of the switch mode power supply operate at a discontinuous current mode or at a critical discontinuous current mode;

(2) detecting a rectified voltage waveform signal (Iac) generated by a rectifier bridge in the main circuit of the switch mode power supply;
(3) obtaining a pulse signal (iemu) with a pulse width indicative of the conduct time of the output diode in the main circuit of the switch mode power supply and an amplitude indicative of the amplitude of the primary-side current signal;
(4) generating a current reference signal (Iref) with a waveform consistent with the output voltage of the rectifier bridge in the main circuit of the switch mode power supply and an amplitude under the control of an amplified error signal generated by an average current loop based on the rectified voltage waveform signal (Iac) obtained through step (2) and the pulse signal (iemu) obtained through step (3); feeding the current reference signal (Iref) back to step (3); controlling the generation of the pulse signal (iemu), wherein the constant output current is in proportion to an average current loop reference signal;
(5) generating a turn-off trigger signal for a drive pulse for a primary-side switch transistor based on the current reference signal (Iref) obtained through step (4) and the sampled primary-side current signal;
(6) generating a conduction trigger signal for the drive pulse for the switch transistor;
(7) repeating steps (1)-(6).

* * * * *